United States Patent [19]
Cachera

[11] 3,968,653
[45] July 13, 1976

[54] APPARATUS FOR THE REMOVAL OF AFTER HEAT IN A SODIUM-COOLED FAST REACTOR

[75] Inventor: Pierre Charles Cachera, Saint-Germain-en-Laye, France

[73] Assignee: Electricite de France (Service National), Paris, France

[22] Filed: Sept. 24, 1974

[21] Appl. No.: 508,855

[30] Foreign Application Priority Data
Oct. 2, 1973  France .......................... 73.35223

[52] U.S. Cl. ................................ 60/644; 176/38; 176/65; 60/658
[51] Int. Cl.² ...................... E21D 3/04; G21D 5/08
[58] Field of Search ............ 60/644, 650, 682, 657, 60/658, 655, 698; 176/35, 60, 68

[56] References Cited
UNITED STATES PATENTS 3,697,372  10/1972  Schabert .......................... 176/60
3,803,836  4/1974  Gilli .................................. 60/698

FOREIGN PATENTS OR APPLICATIONS 1,115,846  6/1959  Germany ........................... 176/65
1,071,893  6/1967  United Kingdom ............. 176/60

*Primary Examiner*—Allen M. Ostrager
*Attorney, Agent, or Firm*—Cameron, Kerkam, Sutton, Stowell & Stowell

[57] ABSTRACT

In a fast reactor in which each cooling loop comprises the primary sodium circuit which exchanges heat with the sodium of a secondary circuit by means of an intermediate heat exchanger, each cooling loop comprises in parallel with the secondary sodium circuit an auxiliary secondary circuit in which a chemically inert gas extracts heat from the primary sodium, said secondary auxiliary circuit being equipped with at least one gas turbine which is supplied with the inert gas and operates in a closed energy-producing gas cycle.

9 Claims, 1 Drawing Figure

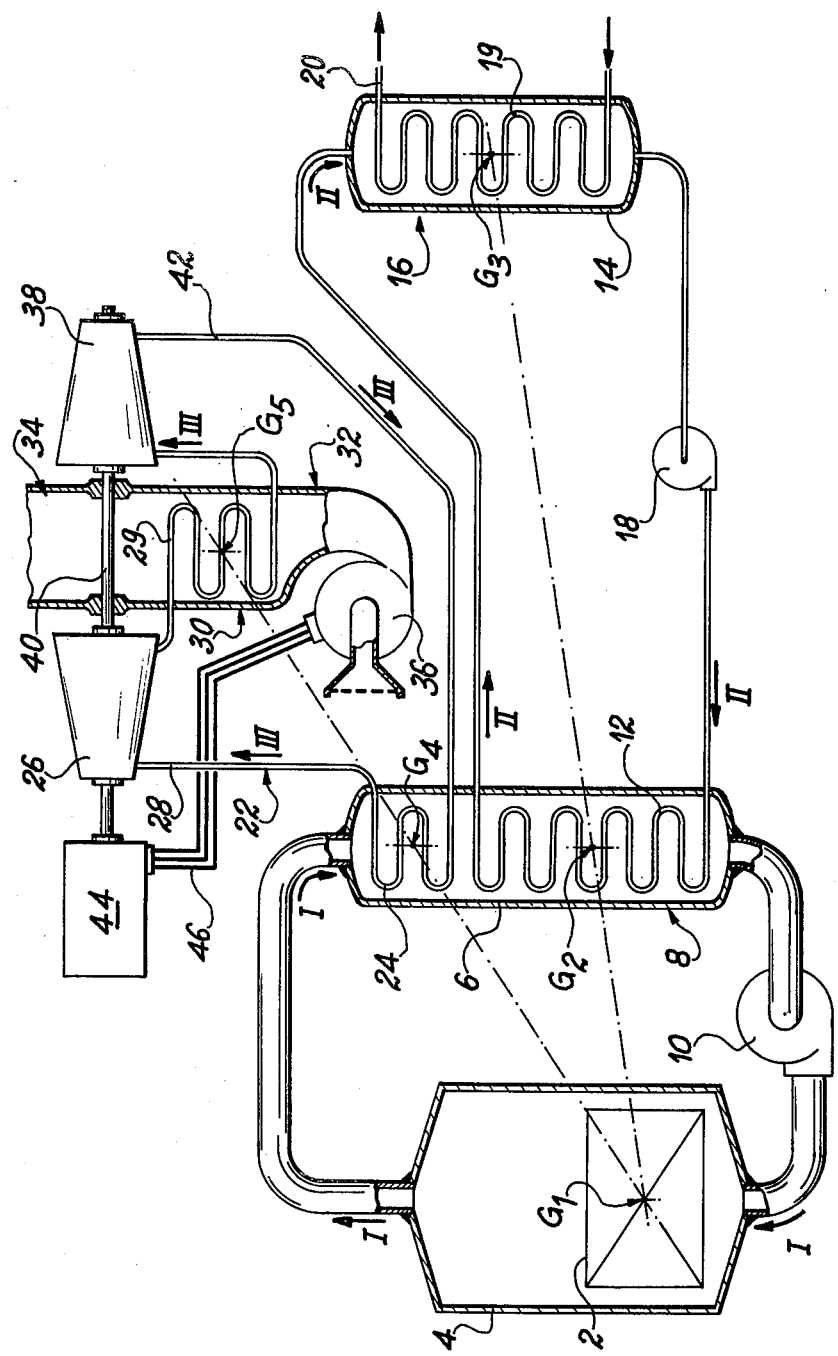

APPARATUS FOR THE REMOVAL OF AFTER HEAT IN A SODIUM-COOLED FAST REACTOR

This invention relates to an independent device for the removal of residual heat from a sodium-cooled fast reactor.

Heat continues to be generated by the core of any nuclear reactor even after the fission chain reaction has ceased. In order to maintain operational safety, it is important to ensure that the residual heat can always be removed after a reactor shutdown caused by an accident or fault condition. For this reason it has been found necessary to make provision for redundant and reliable means in order to extract this residual heat, also known as reactor afterheat, or decay heat.

Since the normal method of heat removal consists in producing steam, the reliability of this system can be improved by making provision for emergency feed pumps supplied with power by a system which can in turn be backed up by auxiliary means (e.g. of the diesel engine type). This accordingly constitutes the first line of defense.

In order to enhance reactor safety, however, it is sought to add means for extracting heat from the reactor core within the shortest possible distance from this latter, thus reducing the number of circuits in series which are required to remain in good operating condition in order that the safety system should come into operation in an effective manner.

It is thus possible to make use of the secondary circuits for the purpose of carrying out a process of heat transfer between the secondary sodium and air. In order to guard against simultaneous failure of all the main secondary circuits, provision can also be made for auxiliary secondary circuits having their auxiliary intermediate heat exchangers either in series or in parallel with the main intermediate heat exchangers. There can also be added a final emergency circuit which is located even nearer to the reactor core in order to permit the removal at the level of the safety containment structure of the heat transferred at a higher temperature, especially by radiation between the different vessels.

Whatever solution is adopted, it is usually found preferable to meet the following requirements for the achievement of enhanced reactor safety:

the emergency circuits must operate continuously, even at only partial power;

the direction of circulation of the fluid must be the direction of natural circulation by thermosiphon, even if it proves necessary to provide said thermosiphon with temporary assistance in the form of an external energy source such as pumps;

the direction of circulation of the fluid must not be reversed between normal operation and emergency operation; and local boiling or entrainments of gas must not be permitted to interfere with the circulation of liquids, in particular within the downcomers;

the number of valves and various devices to be operated must be minimized in order to change-over to the emergency configuration.

A fair degree of reliance is usually placed on natural circulation of the primary sodium by thermosiphon, especially when there is only one volume of inert blanket gas above the free surface of the sodium (this being the case of integrated reactors, that is to say reactors in which the intermediate heat exchangers are located within the interior of the primary reactor vessel).

If auxiliary secondary circuits are required and if it is found preferable not to interfere with the primary circuits in any way after the occurrence of a major fault condition which affects all the secondary circuits simultaneously, it is an advantage in such a case to place the auxiliary intermediate heat exchangers in series with the main intermediate heat exchangers. Accordingly, it is possible without primary thermal distortion to reduce to a minimum the heat which is extracted and which had hitherto been utilized to no purpose by the auxiliary secondary circuits during normal operation of the power plant. The advantage of this design solution is known since it is already applied in certain reactors such as the Prototype Fast Reactor at Dounreay in Scotland.

Up to the present time, consideration has been given to the possibility of filling the auxiliary secondary circuit either with sodium or with a sodium-potassium eutectic mixture. The use of sodium is attended by a potential danger of local circuit blockages whereas the use of sodium-potassium increases the fire hazard in the reactor building and the consequences of leakage in the auxiliary intermediate heat exchanger. While it is an easy matter in both cases to ensure good natural circulation of both sodium and sodium-potassium, natural circulation of air could not be obtained in a final heat exchanger of reasonable size, thus entailing the presence of fans and the problem of an emergency power supply for these latter.

This invention is precisely directed to an independent heat removal device which overcomes the disadvantages mentioned in the foregoing.

The independent device for the removal of after-heat in a sodium-cooled fast reactor of the type in which each cooling loop comprises the primary sodium circuit which exchanges its heat with the sodium of a secondary circuit by means of an intermediate heat exchanger, is characterized in that each cooling loop comprises in parallel with the secondary sodium circuit an auxiliary secondary circuit in which a chemically inert gas extracts heat from the primary sodium, said auxiliary secondary circuit being equipped with at least one gas turbine supplied with said inert gas and operating in a closed energy-producing gas cycle.

In a preferred embodiment, each auxiliary secondary circuit comprises a tube bank which serves to carry out heat exchange with the primary sodium, said tube bank being placed within the shell of said intermediate heat exchanger and above the tube bank of the secondary sodium circuit or in other words upstream in the primary sodium which is at the highest temperature.

In accordance with another characteristic feature, at the outlet of the tube bank of the auxiliary secondary circuit, said circuit comprises at least in series a gas turbine, a terminal auxiliary heat exchanger and a compressor.

In accordance with a further characteristic feature which is chosen by way of example, the terminal heat exchanger of the auxiliary secondary circuit is a natural-draft air exchanger or a forced-draft air exchanger.

The terminal exchanger can also yield its heat to cold water.

In a preferred embodiment, the turbine drives a compressor placed at the outlet of the terminal heat exchanger of the auxiliary secondary circuit and an alternator for driving the ventilating means of the forced-draft heat exchanger.

The turbine can also drive the shaft of the primary sodium pump either by mechanical means or by means of electric conductors.

The gas of the secondary auxiliary circuit is preferably of a type which is different from the inert gas employed as a blanket for the primary sodium circuit in order to facilitate leak detection. For example, if the blanket gas is argon, helium will be adopted as auxiliary fluid.

The heat source of the gas turbine which operates in a closed cycle is therefore constituted by a tube bank which contains the gas under pressure and is immersed in the primary sodium on the upstream side and preferably above the intermediate sodium-sodium heat exchanger. The heat sink is constituted by the gas-air or gas-plain water terminal heat exchanger.

The fact that the auxiliary secondary circuit is an energy-producing gas cycle results in the following advantages:

enhanced net electrical output;

the possibility of continuous economic operation of the emergency secondary circuits at appreciable power and even at full power, thereby achieving enhanced reliability;

the possibility of supplying power independently and in a separate network to auxiliary machines within each of the auxiliary secondary circuits (auxiliaries for regulation, fans or pumps for the heat sources and sinks, and so forth), thus eliminating the causes of common failures which occur simultaneously. As a consequence, each auxiliary secondary circuit is also capable of driving one or a number of sodium or water pumps;

since the auxiliary secondary circuit is filled with gas which is chemically inert with respect to sodium, air and water, there is no danger of fire within the reactor building and in particular above the reactor vault roof on which are mounted other essential devices for ensuring reactor safety;

since the efficiency of the direct gas cycle increases rapidly with the rise in the heat source temperature, this accordingly results in self-regulation of the power removed under emergency conditions. In fact, if the temperature of the primary sodium rises, the energy produced by the gas turbine increases, thereby automatically increasing the air-blowing energy at the heat sink portion of the gas cycle and even the power available for pumping the primary sodium, the secondary sodium or the feed water.

The power removed by the auxiliary gas circuit can be controlled by regulating its pressure. When no provision is made for regulating valves, this method is highly reliable since provision can always be readily made for a reserve supply in the form of a compressed gas cylinder, a make-up quantity of gas being thus introduced in order to increase the pressure within the auxiliary secondary circuit.

A clearer understanding of the invention will in any case be gained from a perusal of the following description of one embodiment of the invention which is given by way of example and not in any limiting sense. Reference will be made to the single accompanying FIGURE in which is shown in vertical cross-section a diagram of the pressurized inert gas and sodium circuits in accordance with the invention.

The primary sodium passes out of the core 2 of the reactor 4 and then penetrates into the shell 6 of the intermediate sodium-sodium heat exchanger 8. At the outlet of the heat exchanger 8, said primary sodium is reinjected into the reactor vessel 4 by means of the primary pump 10. The primary sodium circulates in the direction indicated by the arrows I.

The diagram shown in the accompanying FIGURE is merely intended to give a clear understanding of the invention. It is known in particular that the design of a reactor makes provision for a number of cooling circuits or loops. Only one cooling loop is shown in the FIGURE for the sake of enhanced clarity. In sodium-cooled fast reactors, the reactor core 2, the intermediate heat exchanger 8 and the primary pump 10 can all be placed within a single enclosure or vessel (this arrangement being known as an integrated reactor design). These elements have been dissociated for greater clarity of the diagram and the fact that the diagram corresponds to a loop-circuit reactor does not affect the general validity of the design principle and in particular its application to an integrated reactor, or pool reactor.

The secondary sodium circuit comprises a plurality of tube banks 12 which are placed within the shell 6 of the intermediate heat exchanger 8. The ends of said tube banks 12 are joined together at the inlet and at the outlet of the shell 14 of the steam generator 16. The secondary circuit further comprises a secondary pump 18. The secondary sodium circulates in the direction indicated by the arrows II.

Provision is made within the shell 14 of the steam generator 16 for a tube bank 19 which serves to carry out heat transfer between the secondary sodium and the water contained in the steam circuit 20 which flows towards the turbine or turbines.

All these components are met with in nearly all types of sodium-cooled fast reactors. The independent after-heat removal device proper will now be described.

The device aforesaid is constituted by an auxiliary secondary loop circuit 22. This circuit comprises a bank 24 of heat-exchanger tubes placed within the shell 6 of the intermediate heat exchanger 8 and preferably above the tube bank or banks 12 of the secondary sodium circuit. The outlet of the tube bank 24 is connected to the inlet of the gas turbine 26 by means of the pipe 28. The outlet of the turbine 26 is connected to the inlet of a tube bank 29 of a terminal heat exchanger 30. The heat exchanger 30 is constituted by a duct 32 surmounted by a draft stack 34 supplied with air which can be pulsed by the fan 36. At the outlet of the heat exchanger 30, the tube bank is connected to the inlet of a compressor 38. The compressor 38 is mounted on the shaft 40 of the turbine 26. The outlet of the compressor 38 is connected by means of the pipe 42 to the inlet of the tube bank 24. The turbine 26 drives an alternator 44 which supplies the motor of the fan 36 in a separate network through the conductors 46. The heat exchanger 30 can very easily be an air exchanger of the natural-draft type. It is also possible to replace the air used as coolant within the heat exchanger 30 by any fluid such as river water which circulates in an open cycle, sea water or the water of an atmospheric coolant which circulates in a closed cycle.

Similarly, instead of having the electric leads 46, the fan 36 can be driven directly by the shaft of the turbine 26 through a reduction-gear system (not shown in the FIGURE). Moreover, in accordance with the option which has been indicated in the foregoing, the turbine 26 is also capable of driving, by means of a mechanical shaft (not shown) or by means of electrical conductors which are identical with the conductors 46 but not illustrated, the primary sodium pump 10 and if necessary also the secondary sodium pump 18 and the main or emergency water pump (not shown) which supplies the steam generator 16.

The fluid circulated within the auxiliary secondary circuit is a gas which is chemically inert especially with respect to liquid sodium and which can be helium, argon, nitrogen, and so forth. This gas is preferably different from that which constitutes the top gas blanket of the reactor vessel.

The turbine 26 operates between a heat source constituted by the tube bank 24 and a heat sink constituted by the terminal heat exchanger 30. The hot gas derived from the tubes 24 under pressure then expands within the turbine 26 and yields a certain enthalpy to the transmission shafts. When passing out of the turbine 26, the partially expanded gas is cooled as it traverses the heat-exchanger bank 29 and then compressed within the compressor 38 before being reinjected into the tube bank 24. Within the auxiliary secondary circuit, the gas circulates in the direction indicated by the arrows III.

In the accompanying FIGURE, the points $G_2 \ldots G_5$ represent respectively the centers of gravity of the heat-exchanger tube banks 12, 19, 24 and 29 and the point $G_1$ represents the center of gravity of the reactor core 2. The design is such that the points $G_1$, $G_2$, $G_3$ have increasing heights in order to permit a thermosiphon effect in the main heat extraction circuits. Similarly, the tube banks 24 and 29 are given a spatial arrangement such that the points $G_1$, $G_4$ and $G_5$ have increasing heights in order that a thermosiphon effect may similarly be produced on the auxiliary heat-extraction circuits. It is particularly important to ensure that the point $G_4$ is located at a substantial distance above the point $G_1$ in order to maintain the circulation of primary sodium under all circumstances. On the other hand, it is possible in the particular case (not shown in the FIGURE) in which the terminal heat exchanger 30 is water-cooled to lower the point $G_5$ by virtue of the independent operation of the gas turbine in a closed cycle.

What is claimed is:

1. Apparatus for the removal of afterheat in a sodium-cooled fast reactor of the type in which each cooling loop comprises the primary sodium circuit which exchanges its heat with the sodium of a secondary circuit by means of an intermediate heat exchanger, wherein each cooling loop comprises in parallel with the secondary sodium circuit an auxiliary secondary circuit in which a chemically inert gas extracts heat from the primary sodium, said auxiliary secondary circuit being equipped with at least one gas turbine supplied with said inert gas and operating in a closed energy-producing gas cycle.

2. Apparatus according to claim 1, wherein the gas turbine also drives at least one of primary sodium pumps and at least one of secondary sodium pumps and at least one main or emergency feed water pumps which supply a steam generator.

3. Apparatus according to claim 1, wherein each auxiliary secondary circuit comprises a heat-exchange tube bank placed in the primary sodium upstream of the tube bank which contains the sodium of the secondary circuit.

4. Apparatus according to claim 3 wherein, at the outlet of the tube bank of the auxiliary secondary circuit, said circuit comprises at least in series a gas turbine, a terminal heat exchanger and a compressor driven by said turbine.

5. Apparatus according to claim 4, wherein the terminal heat exchanger of the auxiliary secondary circuit is a natural-draft air coolant.

6. Apparatus according to claim 4, wherein the terminal heat exchanger of the auxiliary secondary circuit is a water coolant.

7. Apparatus according to claim 4, wherein the terminal heat exchanger is a forced-draft air coolant.

8. Apparatus according to claim 7, wherein said turbine also drives an alternator for supplying in a separate network the fan of the forced-draft air exchanger.

9. Apparatus according to claim 5, wherein said turbine drives a pump for a water exchanger.

* * * * *